United States Patent [19]

Yamamoto et al.

[11] 4,262,788

[45] Apr. 21, 1981

[54] FRICTION MEMBER OF NON-ASBESTOS

[76] Inventors: Yasunobu Yamamoto, 22-9, Chiryu; Hiroshi Ban, 8-119, Toyota; Katumi Nakavishi, 150-31, Arimatsuura-Aza, Narumi-cho,, Midori-ku, Nagoya; Ryoichi Tomikawa, 8-119, Nishiyama, Nakane-cho, Toyota; Katumi Nakanishi, 150-31, Nagoya; Ryoichi Tomikawa, 8-199, Toyota; Toshitake Kato, 114-1, Toyoake, all of Japan

[21] Appl. No.: 947,102

[22] Filed: Sep. 29, 1978

[30] Foreign Application Priority Data

Oct. 14, 1977 [JP] Japan .......................... 52-123680
Oct. 31, 1977 [JP] Japan .......................... 52-130404
Feb. 10, 1978 [JP] Japan .......................... 53-14443

[51] Int. Cl.$^3$ .............................................. F16D 11/00
[52] U.S. Cl. ............................. 192/107 M; 162/145; 162/146; 188/251 A; 260/37 M; 260/37 R; 260/38; 428/288; 428/328; 428/379; 428/401; 428/402; 428/935; 428/936; 106/36
[58] Field of Search ............... 428/65, 288, 326, 280, 428/281, 297, 299, 303, 375, 323, 328, 329, 330, 375, 379, 381, 402, 378, 389, 935, 936; 162/145, 146; 188/73.1, 73.2, 251 A, 251 M, 251 R; 192/107 M; 260/17.2, 17.3, 37 R, 37 M, 38; 106/36

[56] References Cited

U.S. PATENT DOCUMENTS

| | | | |
|---|---|---|---|
| 2,415,097 | 2/1947 | Hasimoto | 428/65 |
| 2,419,357 | 4/1947 | Krasner et al. | 428/65 |
| 2,885,379 | 5/1959 | Taylor et al. | 188/251 M |
| 3,068,131 | 12/1962 | Morton | 428/65 |
| 3,316,038 | 4/1967 | Taylor | 428/65 |
| 3,390,750 | 7/1968 | Albertson | 188/251 M |
| 3,434,998 | 3/1969 | Aldrich et al. | 188/251 M |
| 3,650,102 | 3/1972 | Economy et al. | 428/401 |
| 3,703,739 | 11/1972 | Young et al. | 428/65 |
| 3,759,357 | 9/1973 | Marin | 428/65 |
| 3,841,949 | 9/1974 | Black | 428/65 |
| 3,859,160 | 1/1975 | Marin | 428/65 |
| 3,899,050 | 8/1975 | Savary et al. | 188/73.1 |
| 3,956,548 | 5/1976 | Kovac et al. | 428/65 |
| 4,014,968 | 3/1977 | Simon | 428/65 |
| 4,045,608 | 8/1977 | Todd | 428/65 |
| 4,119,591 | 10/1978 | Aldrich | 188/251 R |
| 4,169,182 | 9/1979 | Seki et al. | 428/288 |
| 4,169,911 | 10/1979 | Yoshida et al. | 428/408 |

Primary Examiner—James J. Bell
Attorney, Agent, or Firm—Oblon, Fisher, Spivak, McClelland & Maier; Oblon, Fisher, Spivak, McClelland & Maier

[57] ABSTRACT

A friction member is a clutch facing, a brake pad, or a brake lining which comprises a phenolic fiber, a plated organic fiber, and/or mixed fiber thereof, which may or may not comprise the other fibers such as nonorganic fibers, as based material of the aforementioned friction member, wherein various difficulties of asbestos are improved.

26 Claims, 14 Drawing Figures

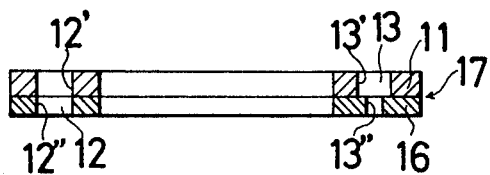
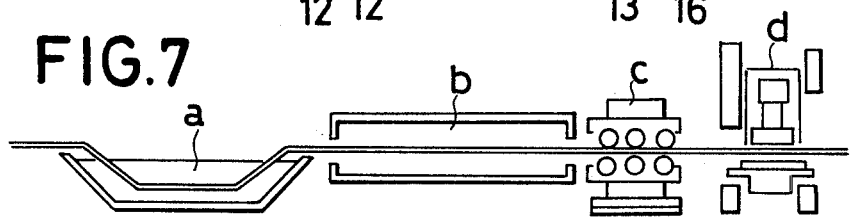
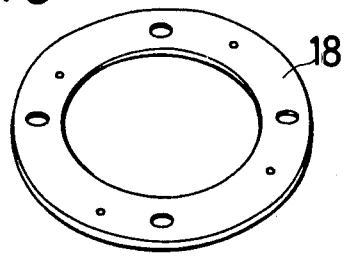
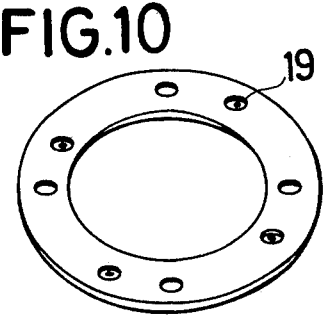
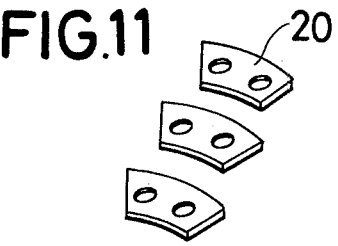
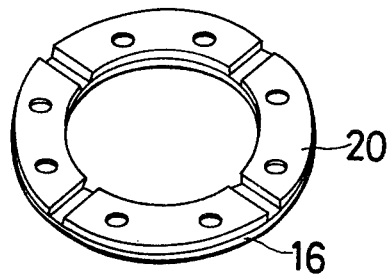

FRICTION MEMBER OF NON-ASBESTOS

BACKGROUND OF THE INVENTION

1. Field of the Invention

The present invention relates to an improved friction member such as a cluch faeing, a brake pad, and a brake lining, and more particularly to a friction member of the type used for automotive parts.

2. Description of the Prior Art

Conventional friction members of the type used for automobile will produce the powder thereof during the steps of drilling, finishing and so on.

The powder comprises asbestos a great deal and is scattered in the manufacturing factory.

Therefore, the scattered powder may hurt the men working at the manufacturing factory, particularly their respiratory organs.

As a result of the animal experiment of a guinea pig, it is proved that the powder will induce a cancer of the lung, after the guinea pig has breathed in a predetermined amount of the asbestos powder every day.

Accordingly, the inorganic fibers such as metal or glass fibers may be substituted for the asbestos.

The inorganic fibers, however, do not widly have a practical application because of the poor friction resistance and so on.

SUMMARY OF THE INVENTION

Accordingly, one object of the present invention is to provide a friction member which will obviate the drawbacks of the asbestos.

Another object of the invention is to provide a frictional member which is of the in substantially same characteristics as the asbestos.

Briefly, these and other objects of the invention as hereinafter will become more readily apparent can be attained by an improved friction member which comprises a phenolic fiber, a plated organic fiber and/or mixtured fibers thereof as based material of the friction member.

The friction member may comprise still several other fibers when necessary.

The friction member may comprise two layers of a friction material and a back plate, when necessary.

BRIEF DESCRIPTION OF THE DRAWINGS

FIG. 6 is a sectional view taken along the lines A—A' of FIG. 4 and A'—A' of FIG. 5;

FIG. 7 is a schematic view of manufacturing of a friction member;

FIG. 8 is a perspective view of a fragmentary frictional material sheet of the friction member;

FIG. 9 is a perspective view of the frictional material obtained by carrying out the system of FIG. 7;

FIG. 10 is a perspective view of the friction member formed as a clutch facing;

FIG. 11 is a perspective view of the frictional material pieces of the clutch facing obtained by carrying out the system of FIG. 7;

FIG. 12 is a perspective view of the clutch facing formed by putting the frictional material pieces of FIG. 11 on the back plate of FIG. 5;

DETAILED DESCRIPTION OF THE PERFFERRED EMBODIMENTS

The term "phenolic fiber" as used herein is an article of commerse which is known as "Kynol".

A diameter of the phenolic fiber is preferably is 50 to 20 micron.

A binder agent is thermosetting resins such as phenolic and polyamide resins.

A friction filler is classified usually as lublicant, improving material of friction cofficient, improving material of anti-wear, improving material of heat conductivity, and so on.

In the aforementioned materials, the lubricant and the improving material of the friction coefficient are contrary materials in the qualities of the friction member. The suitable friction filler is used as ingredient of the friction member, wherein suitable qualities of the friction member are attained.

The term "friction member of non-asbestos" as used herein includes various types of the friction material which is used as a clutch facing, a brake pad, or a brake lining.

The plated organic fiber is obtained by the following methods.

The method is based upon the principle of conventional plastic plating method except for a few differences.

One of the differences is that the method of the invention does not necessarily include the electrolytically plating steps, because the plated organic fiber in this invention is used as based material of the friction member in order to improve qualities thereof such as heat conductivity.

Another difference is that the method of the invention does not necessarily include an etching, and/or a catalyzed adhesive step.

Further difference is that the method of the invention may not use the hanger in order to fix the organic fiber, because the organic fiber has not a shape of a finished good.

The several methods for plating the organic fiber are hereinbelow explained.

Figure 2:
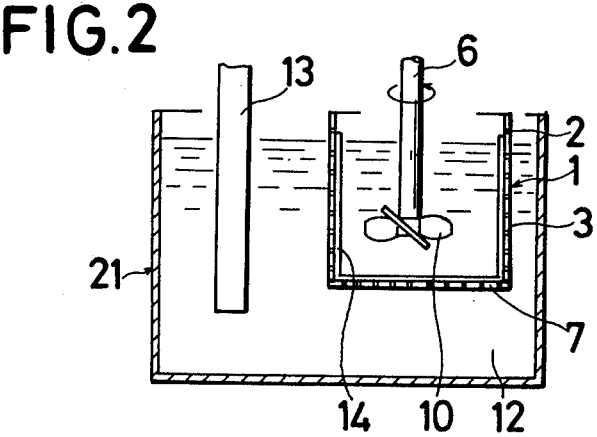
FIG. 2 is a cross-sectional view of an apparatus for plating the organic fiber electrolycally.

In FIG. 2, the number 1 is a box which receives the organic fiber therein and has small holes 2, a wall 3 and a hottom 7.

The numeral 6 is a cathode to be stirred and provided with a stirring blade 10. An anode 13 or 14 is put in an electrolytic solution 12 within an electrolytic container 21.

One of methods for plating the organic fiber is obtained through following steps:

(1) the organic fibers are placed in the box 1, and (2) the box is immersed in the non-electrolytic solution at 50°–100° C. for 1–20 minutes while the stirring member 4 (FIG. 3) is stirring.

Another method for plating the organic fiber is obtained through following steps:

(1) The organic fibers are placed in the box,
(2) the box is immersed in the etching solution,
(3) The box is immersed still more in the non-electrolytic solution.

Futher method for plating the organic fiber is obtained through following steps:

(1) the organic fibers are placed in the box,
(2) the box is immersed in the catalytic solution,
(3) the box is immersed in the non-electrolytic solution.

Still another method for plating organic fiber is obtained through following steps:

(1) the organic fibers are placed in the box,
(2) the box is immersed in the etching solution,
(3) the box is immersed in the catalytic solution,
(4) the box is immersed in the non-electrolytic solution,
(5) the box, is immersed in the electrolytic solution, when necessary.

The term "organic fibers" as used herein is a natural organic and a synthetic organic fiber.

The natural organic fiber is cotton, pulp, flax fibers, or the like.

The synthetic organic fiber is phenolic, rayon fibers or the like.

Th aforementioned non-electrolytic solution comprises a metallic salt, a reductant, a stabilizer within water under alkaline or acid, and still more pH preparation material when necessary.

The metallic salt is copper, nickel, zinc, tin, aluminum salts or the like of hydrochloric, sulfuric, nitric acids or the like.

One of the reductants is ortho-phesphorous, hypophosphorous acids or salts thereof, organic reductants such as hydroquinone, wherein the metal only is isolate on the organic fiber.

Another reductant is sulfurous acid or salts thereof, wherein the metallic sulphide only is isolated on the organic fiber.

Futher reductant is thiosulfuric acid salts, wherein the metal and the metallic sulphide are isolated on the organic fiber.

The term "stabilizer" as used herein is chosen from suitable material such as complexing agents according to the used metallic salts.

Upon using the cupper salt, the rochelle salt, EDTA (ethylene diamine tetraacetic acid), DTPA (diethyl triamine) or the like is used.

Upon using the nickel salt, the sodium citrate, sodium acetate, sodium tartrate or the like is used.

The term "pH preparation material" as used herein is alkaline or acid materials.

If acid in non-electrolytic solution, acid materials such as sulfuric acid are used.

If alkaline in non-electrolytic solution, alkaline materials such as caustic soda are used.

Suitable rate of mixing within water in non-electrolytic solution is about 1–300 g of the metallic salts, about 1–200 g of the reductants, and about 1–200 g of the stabilizer for 1000 g of water.

PH preparation material is added within water, until obtaining desired pH, after the aforementioned mixing is attained.

The temperature of non-electrolytic solution is room temperature to boiling point, and more preferably 60° C. to boiling point.

Etching solution is obtained by mixing within water suitable materials which attain porous surface of organic fibers.

Upon being the organic fibers which are etched in alkaline, the alkaline material is mixed within water, wherein etching solution is obtained.

Upon being the organic fibers which are etched in acid, the acid material is mixed within water, wherein etching solution is obtained.

Concentration and temperature of the etching solution is adequately determined as sort of the organic fiber.

The catalytic solution is obtained by mixing suitable materials such as tin or palladium salts within water.

Concention and temperature of the catalytic solution are also determined adequately.

Required devices in the aforementioned methods are required boxs which place the organic fibers, and required containers which place the non-electrolytic solution and so on.

The device of electrolytic plating is also required of, when necessary.

The washing step in water is required of, between the aforementioned steps.

Still another method is attained in the following manner: the endless organic fiber continuously immerses into the aforementioned solutions, and then the organic fiber is cut into required length.

Still another method is attained by carrying out the applied diaphragm method.

Methods of manufacturing the clutch facing are hereinbelow disclosed.

One of the methods is attained in the following manner:

(1) the friction fillers and one of the phenolic fibers and the plated organic fiber which may or may not comprise a few supplementary fibers are mixed and taken apart into pieces by a beater machine,
(2) The mixture is made into a paper by a paper machine,
(3) The paper is immersed into solution of binder agent comprising solvent,
(4) The immersed product is dried and pre-heated,
(5) The pre-heated product is formed with heat and pressure by suitable machine such as compression molding machine,
(6) The formed product is stamped into the shape of a loop with suitable machine such as crank press, and
(7) The stamped product is provided with holes there through by suitable machine such as drilling press.

Another method thereof is attained in the following steps:

(1) the friction fillers and one of the phenolic fibers and the plated organic fibers which may or may not comprise a few supplementary fibers are mixed and taken apart into pieces, and then the mixture are provided as yarn by conventional method,
(2) The yarn is immersed within solution of binder agent comprising solvent,
(3) The immersed product is dried and pre-heated,
(4) The pre-heated product is made into loop shape,
(5) The product is formed with heat and pressure by suitable machine such as the compression molding machine, and (6) The formed product is after-heated in an industrial oven.

Futher method thereof is attained in the following steps:

(1) the friction fillers and one of the phenolic fibers and the plated organic fiber which may or may not comprise a few supplementary fibers are provided as felt by conventional method, (2) The felt is immersed within solution of binder agent comprising solvent, (3) The immersed product is dried and pre-heated, (4) The pre-heated product is formed with heat and pressure by suitable machine such as the compression molding machine, (5) The formed product is stamped into the shape of the loop with suitable machine such as crank press, and (6) The stamped product is provided with holes therethrough by suitable machine such as drilling press.

Suitable friction fillers in clutch facing are carbon fiber, rubber dust, cashew dust, metallic sulfide, graphite, glass powder and/or metallic powders such as aluninum, cupper, or iron powders.

Upon using the phenolic fiber as based material of clutch facing, the ratio of mixing the friction filler is zero to 30 percent by weight, and more preferably 5 to 15 percent by weight.

The ratio of mixing the binder agent thereof is 10 to 40 percent by weight and more preferably 15 to 30 percent by weight.

The ratio of mixing the phenolic resin thereof is 20 to 80 percent by weight, and more preferably 40 to 60 percent by weight.

Upon using the plated organic fiber as based material of the clutch facing, the ratio of mixing the friction filler is zero to 15 percent by weight, and more preferably zero to 10 percent by weight.

The ratio of mixing the binder agent thereof is 10 to 30 percent by weight, and more preferably 20 to 30 percent by weight.

The ratio of mixing the plated organic fiber thereof is 30 to 90 percent by weight, and more preferably 50 to 70 percent by weight.

The aforementioned friction member of clutch facing of this invention shows the low value in burst strength. It may be effective to mix the metal powder as improvement of the aforementioned difficulty.

The aforementioned supplementary fibers may be effective to be a natural fiber and/or a synthetic orgaic fiber in which a diameter thereof is 5 to 25 micron.

The friction member (clutch facing) obtained by the aforementioned methods is some inferior to the burst strength.

Upon improving the aforementioned difficulty, the following method is effective.

Figure 4:
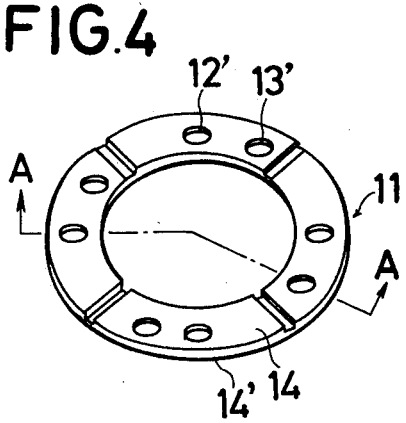
FIG. 4 is a perspective view of a frictional material formed as clutch facing.
Figure 5:
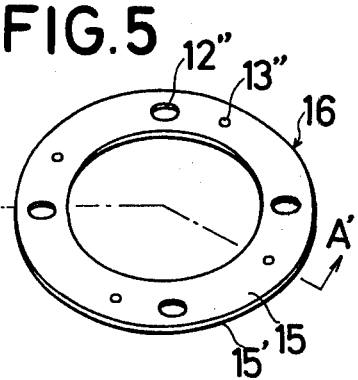
FIG. 5 is a perspective view of a back plate for use with frictional material of FIG. 4.

In FIG. 4, the numeral 11 is a frictional material (the aforementioned clutch facing), 12' is a partial portion of a straight hole 12 of FIG. 6, 13' is a rivet hole, 14 and 14' are the frictional and the contacted surfaces. In FIG. 5, 16 is a back plate, 12'' is a complementary portion of the straight hole, 13'' is a rivet hole complementary to the hole 13', 15 and 15'' are the bottom or contacted surfaces. The one surface of frictional material is adhered to the one surface of back pate with an adhesive agent.

The aforementioned adhesive agent is selected from a group of adhesive agents which stand generated heat and generated shear force, while the clutch facing is engaged with opponent members (a fly wheel or a pressure plate). The preferable example thereof is thermosetting resin such as phenolic adhesive agent.

The back plate is used in clutch facing, wherein the burst strength and the heat conductivity thereof are improved and the low cost thereof is attained.

The back plate, therefore, is preferably a metallic material or a thermosetting plastic in which the heat conductivity is improved by adding an improving material therein.

The suitable metallic material ia aluminum, iron, zinc or the like.

The suitable thermosetting plastic is phenolic, melamine, urea plastics or the like.

Methods of manufacturing the brake pad or brake lining are hereinbelow disclosed.

One of the methods is attained in the following manner:

(1) the friction filler, the binder agent, and the organic fiber which may or may not comprise a few supplementary fibers are mixed and sufficiently stirred by suitable mixing machine such as Nauta Mixer, (2) the mixture is pre-formed and contacted with back metal with room temperature and pressure, (3) the pre-formed product is formed with heat and pressure, while initially removing gas to the atmosphere by means of reduced pressure, (4) the formed product is cured in the industrial oven, and (5) the cured product is cooled, and smoothed, to thereby obtain the finished brake lining or the brake pad.

Another method is attained in the following manner:

(1) the friction filler, the binder agent, and the organic fiber which may or may not comprise a few supplementary fibers are mixed and sufficiantary stirred by suitable mixing machine such as Nauta Mixer, (2) the mixture is made into sheet in which cutting slits are provided, (3) the sheet is cut by a cutting machine through the cutting slits, (4) the cut product is cured and contacted with back metal in the industrial oven, and (5) the cured product is cooled, and smoothed, to thereby obtain the finished lining or the brake pad.

The ratio of mixing component in the brake lining and the brake pad is illustrated in the following Table 1, wherein the percent is shown all by weight.

TABLE 1

| Mixing Component | Ratio of mixing component | Brake pad | Brake lining |
| --- | --- | --- | --- |
| The plated organic fiber | usial range | 20~60(%) | 20~70(%) |
|  | preferable range | 35~45 | 40~50 |
| The friction filler | usial range | 20~80 | 10~70 |
|  | preferable range | 30~50 | 25~55 |
| The binder agent | usial range | 8~20 | 10~30 |
|  | preferable range | 10~15 | 10~20 |

The aforementioned supplementary fiber is the organie fiber, ceramic fiber, metallic fiber, and/or the like.

Having generally described the invention, a more complete understanding can be obtained by reference to certain specific examples, which are included for purposes of illustration only and are not intended to be limiting unless otherwise specified. In the Examples, all percents are by weight.

EXAMPLE 1

The phenolic fiber of 80 percent, the aluminum powder of 10 percent, and the graphite of 10 percent were placed and mixed in a beater machine for 30 minutes.

The mixture was then made into paper of 3.5 mm in a paper machine, and the paper obtained is carried out through steps of FIG. 7. In the first step of FIG. 7, the aforementioned paper was immersed in solution (a) for 2 minutes which comprises the phenolic resin of 20 percent of an involatile part, and solvent, and then the immersed product was taken out therefrom, wherein 25 percent of phenolic resin of the involatile part was soaked for the immersed product of 100 percent.

The immersed product obtained was dried, wherein a great part of the solvent was removed therefrom.

In the second step of FIG. 7, the dried product was cured at 150° C. for 1 hour in the industrial oven (b).

In the third step of FIG. 7, the cured product was formed in a pressure roller (c) set at 150° C. and 300 kg/cm², wherein the seet (17 of FIG. 8) was obtained.

In the last step of FIG. 7, the formed product (the sheet) was stamped by the crank press (d) in a shape shown in FIG. 9.

The stamped product was then drilled, wherein the drilling hole 19 shown in FIG. 10 was obtained.

EXAMPLE 2

The sheet 17 of FIG. 8 was obtained through the same manner of Example 1, except that the paper of 2.0 mm was made.

The sheet was then stamped in the shape 20 shown n FIG. 11 with crank press.

The stamped product was adhered on the back plate 16 of FIG. 5 of 1.5 mm with the adhesive agent of the phenolic resin.

The adhered product was fixed in a pressure Jig (not shown), and the fixed product may stand at 150° C. for 2 hours.

EXAMPLE 3

The phenolic fiber of 50 percent, the cotton fiber of 30 percent, the graphite of 10 percent were placed, and mixed in the beater machine for 30 minutes.

The mixture was made into a felt of 3.5 mm in a conventional method.

The felt was immersed in the solution (a) of FIG. 7 for 2 minutes, wherein 25 percent of phenolic resin of the involatile part was soaked for the immersed product of 100 percent.

The immersed product was dried, therein a great parts of the solvent was removed therefrom.

The dried product was cured in the industrial oven (b) of FIG. 7 at 150° C. for 1 hour.

The cured product was formed in the pressure roller (c) of FIG. 7 at 150° C. and 300 kg/cm², for 2 minutes.

The formed product was stamped with crank press (d) of FIG. 7 into the shape 18 shown in FIG. 9.

The stamped product was drilled, wherein the drilling hole 19 shown in FIG. 10 was obtained.

EXAMPLE 4

The formed product was obtained through the same manner as Example 3, exept that the paper of 2.0 mm was made, thereafter the finished clutch facing was obtained through the same manner as Example 2.

EXAMPLE 5

The phenolic fiber of 50 percent, the rayon fiber of 30 percent, the aluminum powder of 10 percent, and the graphite of 10 percent were placed and mixed in the beater machine for 30 minutes, thereafter the finished clutch facing was obtained through the same manner as Example 1.

EXAMPLE 6

The formed product was obtained through the same manner as Example 5, exept that the sheet of 2.0 mm was obtained, thereafter the finished clutch facing was obtained through the same manner as Example 2.

EXAMPLE 7

The pulp of 1 kg placed in the box was plated by immersing in the non-electrolytic solution of 20 l at 100° C. for 10 minutes.

The plated pulp of 88 percent, the carbon fiber of 2 percent, and the glass powder of spherical state of 10 percent were placed and mixed for 30 minutes in the beater machine.

The mixture obtained was made into the paper of 3.5 mm with the paper machine.

The paper was immersed in the solution (a) of FIG. 7 for 2 minutes, wherein 20 percent of the phenolic resin of the involatile part was soaked for the immersed product of 100 percent.

The immersed product was dried, wherein a great parts of the solvent was removed therefrom.

The dried product was cured in the industrial oven (b) of FIG. 7 at 150° C. for 1 hour.

The cured product was formed in the pressure roller (c) of FIG. 7 at 150° C. and 300 kg/cm² for 2 minutes.

The formed product was stamped with crank press (d) of FIG. 7 into the shape shown in FIG. 9.

The stamped product was drilled, wherein the drilling hole shown in FIG. 10 was obtained.

Note:
(1) The aforementioned non-electrolytic solution comprises a a nickel chloride of 40 g, a sodium citrate of 40 g, a sodium hypophosphite of 40 g, and 1/10 purified sodium bydroxide of 10 ml for the water of 1000 cc.

(2) The washing step is omitted in the above case.

EXAMPLE 8

The formed product was obtained through the same manner as Example 7, exept that the sheet of 2.0 mm was made, thereafter the finished clutch facing was obtained through the same manner as Example 2.

EXAMPLE 9

Figure 1:
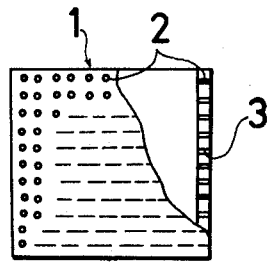
FIG. 1 is a frout view partially in cross seclion of a box for receiving a friction member therein when plating.

The phemolic fiber of 1 kg placed in the box shown in FIG. 1 was plated electrolytically through the following steps of Table 2.

TABLE 2

| number of step | name of step | immerged period | temperature of the solution | component of the solution |
|---|---|---|---|---|
| 1 | oil extraction | 3 (min) | 50(°C.) | marketting solution |
| 2 | etching | 10 | 60~70 | 25% nitrate of volume of water solution produced by Okuno Co., Ltd. |
| 3 | catalyst | 7 | 50 | |
| 4 | accelerator | 3 | 45 | produced by |

TABLE 2-continued

| number of step | name of step | immerged period | temperature of the solution | component of the solution |
|---|---|---|---|---|
| 5 | non-electrolysis | 10 | 40 | Okuno Co., Ltd. produced by Okuno Co., Ltd. |
| 6 | electrolysis | 15 | 50 | cupper pyro-sulphate of water solution |

The washing steps are omitted in the above case.

The plated phenolic fiber of 60 percent is then mixed with the cotton fiber of 40 percent.

The mixture was made into the felt of 3.5 mm, thereafter the finished clutch facing was obtained through the same manner as Example 7.

Example 10

The formed product was obtained through the same manner as Example 9, except that the felt of 2 mm was made, thereafter the finished clutch facing was obtained through the same manner as Example 8.

EXAMPLE 11

Figure 3:
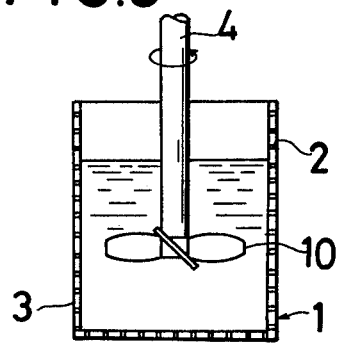
FIG. 3 is a cross sectional view of a box similar to that of FIG. 1 but showing the box in the operational condition.

The cotton fiber of 1 kg placed in the box (FIG. 1) was plated by immersing in the non-electrolytic solution of 20 l at 80° to 90° C. for 12 minutes in pH 12, while the cotton fiber was stirring by the stirring member 4 of FIG. 3 (but not the cathode).

The plated cotton fiber was sufficiently stirred with Nauta Mixer, and mixed with the phenolic powder resin of 10 percent, the rubber dust of 6 percent, cashue dust of 6 percent, the barium sulfate of 17 percent, and the cupper powder of 10 percent.

The product was preformed at room temperature and 100 kg/cm² by the compression molding machine, while contacting with the back metal in the metal mold.

The preformed product was formed by another compression molding machine at 150°~155° C. and 200 kg/cm² for 5 minutes, when initially removing the gas into the atmosphere therefrom.

The formed product was then heated at 180° to 200° C. for 5 hours in the industrial oven, wherein the finished brake pad was obtained.

Note:

(1) The aforementioned non-electrolytic water solution comprises the nickel chloride of 60 g, the cobalt chloride of 60 g, the sodium tartrate of 30 g, sodium hyposphite of 25 g, and the orthophosphorous acid of 25 g for 1 l of water.

(2) The washing step is omitted in above case.

EXAMPLE 12

The pulp of 1 kg placed in the box shown in FIG. 1 was obtained through the following steps, while stirring by the stirring member shown in FIG. 3.

(1) immersing the pulp into the catalyst solution of 20 l at 45° C. for 7 minutes, (2) immersing the pulp into the accelerator solution of 20 l at 45° C. for 3 minutes, (3) immersing the pulp into the non-electrolytic solution of 20 l at 90° to 100° C. for 8 minutes.

The plated pulp of 20 percent and the cupper fiber of 15 percent were mixed and stirred for 30 minutes in Nauta Mixer.

The mixed product was still mixed and stirred for 30 minutes with the phenolic powder resin of 15 percent, the cashue dust of 4 percent, rubber dust of 4 percent, graphite of 6 percent, the barium sulfate of 16 percent, and the cupper powder of 10 percent.

The required amount of the mixture was weighted, thereafter the finished brake pad was obtained through the same manner as Example 11.

Note:

(1) The aforementioned catalyst solution was consisted in the ratio of a raw catalyst solution: conc hydrochloric acid: water = 1:1:4.

(2) The accelerator solution was water solution which comprises conc sulfuric acid of 7 percent.

(3) The non-electrolytic solution comprised the cobalt sulfate of 120 g, the potassium thiosulfate of 50 g, and the tartaric acid of 50 g for 1 l of water.

(4) The washing steps are omitted in above case.

EXAMPLE 13

The phenolic fiber of 1 kg placed in the box shown in FIG. 1 was plated through the following steps, while stirring by the stirring member shown in 4 of FIG. 3;

(1) immersing the phenolic fiber into the etching solution of 20 l at 60° C. for 15 minutes, (2) immersing it into the sensitizer solution of 20 l at 30° C. for 4 minutes, (3) immersing it into the activator solution of 20 l at 45° C. for 5 minutes, (4) immersing it into the non-electrolytic solution of 20 l in pH 12 at boiling point for 5 minutes.

The plated phenolic fiber of 45 percent was then stirred sufficiently in Nauta Mixer, and the same was still mixed and stirred sufficiently with the phenolic powder resin of 15 percent, the cashue dust of 6 percent, the rubber powder of 10 percent, the barium sulfate of 13 percent, the graphite of 3 percent, and the cupper powder of 8 percent therein.

The required amount of the mixture obtained was weighted.

The weighted product was pre-formed by the compression molding machine at room temperature with 100 kg/cm².

The pre-formed product was formed by another compression molding machine at 150° to 155° C. and 200 kg/cm² for 5 minutes while initially removing the gas into the atmosphere therefrom.

The formed product was heated in the industrial oven at 170° to 200° C. for 4 hours.

The heated product was cooled and contacted with the back metal.

Note:

(1) The aforementioned etching solution was the water solution which comprises the nitric acid of 20 percent.

(2) The sensitizer solution comprised the stannous chloride of 20 g and the conc sulfuric acid of 40 g for 1 l of water (3) The accelerator solution comprised the palladium chloride of 0.4 g and conc hydrochloric acid of 40 g for 1 l of water.

(4) The non-electrolytic solution comprised the rochelle salt of 40 g, and the paraformaldehyde of 40 g for 1 l of water.

(5) The washing steps in the aforementioned disclosure are omitted.

EXAMPLE 14

The rayon fiber of 1 kg placed in the box shown in the FIG. 1 was plated through the following steps, while stirring by the stirring member shown in FIG. 3 (but not the cathode):

(1) immersing the rayon fiber into the etching solution of 20 l at 50° C. for 12 minutes, and (2) immersing it into the non-electrolytic solution of 20 l at 90° C. to boiling point for 10 minutes in pH 4.5.

The plated rayon fiber of 30 percent and the phenolic fiber of 15 percent was then mixed and stirred for 30 minutes in Nauta Mixer, and the same was mixed uniformly and stirred with the phenolic powder resin of 15 percent, the cashue dust of 6 percent, the rubber powder of 10 percent, the barium sulfate of 13 percent, the cupper powder of 8 percent, and the graphite of 3 percent therein, thereafter the finished brake lining was obtained through the same manner as Example 13.

Note:

(1) The etching solution was the water solution comprising the nitrate acid of 5%.

(2) The non-electrolytic solution comprises the nickel chloride of 130 g, the hydroquinone of 20 g, the pottassium sulfite of 15 g, the pottassium thiosulphate of 15 g, and the acetic acid of 50 g.

(3) The washing steps in the aforementioned disclosere are omitted.

EXAMPLE 15

The plated phenolic fiber of 1 kg obtained in the Example 13 was still plated electrolytically by immersing it into the cupper pyrosulfate of water solution shown in FIG. 2 for 15 minutes at 55° C. in pH 8.8 under 4 V, while stirring by the cathode member, thereafter the finished brake lining was obtained through in the same manner as Example 13.

Note:

(1) The cupper pyrosulfate comprises the cupper pyrosulfate of 94 g, the pottassium pyrophosphate of 340 g, and the ammonia aqua of 3.0 ml.

(2) The washing step in the aforementioned disclosure is omitted.

COMPARISON EXAMPLE 1

The asbestos fiber of 60 percent, the cotton fiber of 30 percent, and the cashue dust of 10 percent were mixed and made into the ashestos fiber sthing, while the fine wire of the brass was used as the core.

The asbestos fiber string was immersed into the binder solution which comprised the solvent and the phenolic resin, wherein 25 percent of the phenolic resin of the involatile part was soaked for every asbestos fiber string.

The immersed asbestos fiber string was dried at 130° C. for 5 minutes.

The dried product made into the loop shape.

The loop product was formed by the compression molding machine at 150° C. and 250 kg/cm² for 2 minutes.

The formed product was heated in the industrial oven at 180° C. for 12 hours.

COMPARISON EXAMPLE 2

The finished brake pad was obtained through the same manner as Example 11, exept that the asbestos of 45 percent as based material thereof was substituted for the plated cotton fiber of 45 percent.

COMPARISON EXAMPLE 3

The finished brake lining was obtained through the same manner as Example 13, exept that the asbestos of 50 percent as based material thereof was substituted for the plated phenolic fiber of 50 percent.

The friction members obtained by the aforementioned Examples of 1 to 15 and Comparison Examples of 1 to 3 are tested by the testers of the suitable types.

The test result is illustrated in the following Table 3, FIGS. 13, and 14.

TABLE 3

| | specific gravity | porosity (%) | friction coefficient | amount of wear (mm) | detector of shudder | burst strength (r.p.m.) |
|---|---|---|---|---|---|---|
| Example 1 | 0.86 | 38 | 0.3~0.4 | 0.38 | Good | 8,000 |
| Example 2 | 1.30 | 38 | " | 0.30 | " | above 18,000 |
| Example 3 | 0.92 | 32 | " | 0.40 | " | 10,500 |
| Example 4 | 1.35 | 31 | " | 0.32 | " | above 18,000 |
| Example 5 | 0.84 | 35 | " | 0.45 | " | 8,000 |
| Example 6 | 1.32 | 36 | " | 0.38 | " | above 18,000 |
| Example 7 | 0.80 | 25 | " | 0.3~0.6 | " | 8,000 |
| Example 8 | 1.40 | 25 | " | " | " | above 18,000 |
| Example 9 | 0.70 | 25 | " | " | " | 8,000 |
| Example 10 | 1.30 | 25 | " | " | " | above 18,000 |
| Comparison Example 1 | 1.70 | 8 | 0.3~0.4 | 0.40 | Good | 16,500 |

A detector of shudder (a gauge of shudder) was fitted on a floor of the automobile to measure the vibration generated on the body of the automobile and record the maximum value thereof when the automobile starts with the semi-clutch condition. The average of the maximum values of 200 times is shown in the Tables.

The value of the friction coefficient is measured by a dynamometer of a full size machine at 200° C. on the frictional surface.

The value of the rate of wear is measured by a dynamometer of a full size machine at 200° C. on the frictional surface.

The value of the burst strength is measured by a gauge of a burst tester.

Figure 13:
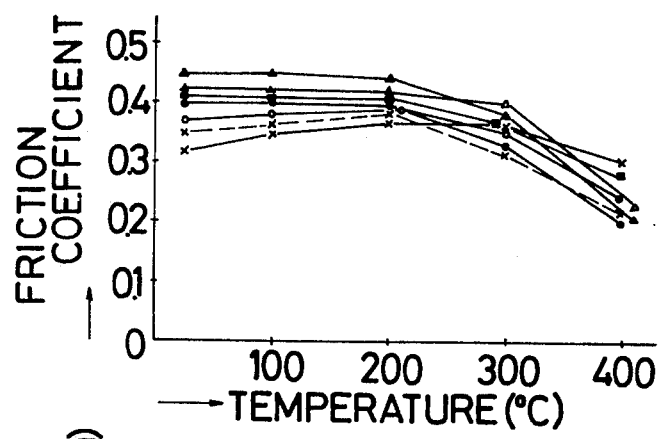
FIG. 13 is a graph showing the friction coefficient of the brake lining and the brake pad of the invention in comparison with the conventional friction coefficient.
Figure 14:
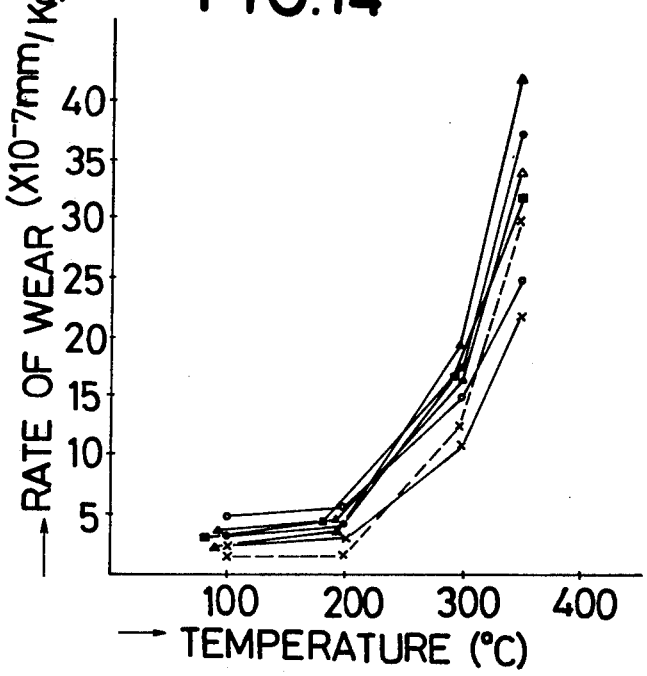
FIG. 14 is a graph showing the rate of wear of the brake lining and the brake pad of the invention in comparison with the conventional rate of wear.

In FIGS. 13 and 14, the marks used therein mean as follows:

——— O ———: Example 11    ——— X ———: Example 12
——— X ———: Example 13                      : Example 14
                           : Example 15
                           : Comparison Example 2
                           : Comparison Example 3

What is claimed as new and intended to be secured by Letters Patent of the United States is:

1. A friction member comprising organic fibers selected from the group consisting of phenolic fibers and plated organic fibers, a binder and a friction filler.

2. The friction member of claim 1, wherein said friction member is a clutch facing.

3. The friction member of claim 1 wherein said friction member additionally comprises one or more supplementary fibers selected from the group consisting of natural fibers, synthetic organic fibers and inorganic fibers.

4. The friction member of claim 3, wherein the diameter of said organic fiber is 3 to 30 microns.

5. The friction member of claim 3, wherein said natural fibers are selected from the group consisting of cotton, flax and pulp fibers.

6. The friction member of claim 3, wherein said synthetic organic fibers are rayon fibers.

7. The friction member of claim 3, wherein said inorganic fibers are selected from the group consisting of copper, iron, and ceramic fibers.

8. A clutch facing comprising the friction member of claim 1, having adhesively bonded to one major surface thereof a back plate made of a material selected from the group consisting of metal and thermosetting plastics.

9. The clutch facing of claim 8, wherein said metal is selected from the group consisting of aluminum, iron or zinc.

10. The friction member of claim 8, wherein the adhesive agent used for said adhesive bonding is a phenolic resin.

11. The clutch facing of claim 8, wherein said thermosetting plastic is selected from the group consisting of phenolic, urea and melamine resins.

12. The friction member of claim 1, wherein said friction member additionally comprises a metal powder.

13. The friction member of claim 12, wherein said metal powder is selected from the group consisting of copper, aluminum, iron or zinc powder.

14. The friction member of claim 3, wherein said friction member comprises 20 to 80 percent by weight of said phenolic and said supplementary fibers, 10 to 40 percent by weight of said binder agent, and 0 to 30 percent by weight of a friction filler.

15. The friction member of claim 14, wherein said friction member comprises 40 to 60 percent by weight of said phenolic and said supplementary fibers, 15 to 30 percent by weight of said binder agent, and 5 to 15 percent by weight of friction filler.

16. The friction member of claim 3, wherein said friction member comprises 30 to 90 percent by weight of said plated organic fibers and said supplementary fibers, 10 to 30 percent by weight of said binder agent, and 0 to 15 percent by weight of a friction filler.

17. The friction member of claim 16, wherein said friction member comprises 50 to 70 percent by weight of said plated organic fibers and said supplementary fibers, 20 to 30 percent by weight of said binder agent, and 0 to 10 percent by weight of said friction filler.

18. The friction member of claim 1, wherein said organic fiber is a plated organic fiber and said plated organic fiber is produced by immersing said organic fiber in an aqueous electroless plating solution which comprises an effective amount of a metallic salt reductant, and a stabilizer under alkaline or acid conditions.

19. The friction member of claim 18, wherein said plated organic fiber is produced by immersing said organic fiber successively in an etching, a catalytic, and said electroless plating solution.

20. The friction member of claim 19, wherein said plated organic fiber is produced by successive immersion in said etching, catalytic, and electroless plating solution followed by electrolytic plating.

21. The friction member of claim 18, wherein said metallic salt is selected from the group consisting of copper and nickel salts.

22. The friction member of claim 18, wherein said stabilizer is selected from the group consisting of rochelle salt, EDTA (ethylene diamine tetraacetic acid), DTPA (diethyl triamine), sodium acid citrate, sodium acetate or sodium tartrate.

23. The friction member of claim 18, wherein said reductant is selected from the group consisting of orthophosphorous acid, hypophosphorous acid and salts thereof, sulfurous acid and salts thereof, and thiosulfuric acid salts.

24. The friction member of claim 18, said electroless plating solution comprises a pH buffer.

25. The friction member of claim 1, wherein said friction member is a brake pad.

26. The friction member of claim 1, wherein said friction member is a brake lining.

* * * * *

UNITED STATES PATENT AND TRADEMARK OFFICE
CERTIFICATE OF CORRECTION

PATENT NO. : 4,262,788
DATED : April 21, 1981
INVENTOR(S) : YASUNOBU YAMAMOTO ET AL It is certified that error appears in the above—identified patent and that said Letters Patent is hereby corrected as shown below:

On the Title page, Item [76] should read as follows:

-- Yasunobu Yamamoto, 22-9, Chiryu; Hiroshi Ban, 8-119, Toyota; Katumi Nakanishi, 150-31, Nagoya; Ryoichi Tomikawa, 8-119, Toyota; Toshitake Kato, 114-1 Toyoake, all of Japan --.

Signed and Sealed this

Thirtieth Day of June 1981

[SEAL]

Attest:

RENE D. TEGTMEYER

Attesting Officer

Acting Commissioner of Patents and Trademarks